(12) United States Patent
Kitagawa

(10) Patent No.: US 6,507,443 B2
(45) Date of Patent: Jan. 14, 2003

(54) LENS, LENS DEVICE, CAMERA MODULE AND ELECTRICAL EQUIPMENT

(75) Inventor: Toshitake Kitagawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 82 days.

(21) Appl. No.: 09/725,568

(22) Filed: Nov. 30, 2000

(65) Prior Publication Data

US 2001/0003494 A1 Jun. 14, 2001

(30) Foreign Application Priority Data

Dec. 2, 1999 (JP) .......................................... 11-343204

(51) Int. Cl.⁷ ............................ G02B 13/18; G02B 3/02
(52) U.S. Cl. ..................... 359/718; 359/717; 359/708
(58) Field of Search ........................... 359/718, 717, 359/716, 715, 714, 713, 795, 794, 793, 792, 791, 785, 783, 781, 708

(56) References Cited

U.S. PATENT DOCUMENTS 5,619,380 A * 4/1997 Ogasawara et al. .......... 359/661
5,828,480 A * 10/1998 Nakamura et al. .......... 359/206
6,011,660 A * 1/2000 Nagahara .................... 359/793

FOREIGN PATENT DOCUMENTS

JP          10-282410          10/1998

* cited by examiner

Primary Examiner—Georgia Epps
Assistant Examiner—Timothy J Thompson
(74) Attorney, Agent, or Firm—Oblon, Spivak, McClelland, Maier & Neustadt, P.C.

(57) ABSTRACT

A lens comprises a single lens, both surfaces of the lens is a meniscus-shaped and aspheric lens, and side surface side thereof is a convex surface, and, when a refractive index of the lens is represented by n, a central thickness thereof is represented by t, a radius of curvature of a concave face thereof is represented by r1, the radius of curvature of the convex face thereof is represented by r2, and a focal length thereof is represented by f, the lens satisfies the following equations:

$$-0.2 < \left(\frac{n-1}{r1}\right)/f < 0,$$

$$0.08 < \left(\frac{1-n}{r2}\right)/f < 0.1, \text{ and}$$

$$0.35 < t/f < 0.55.$$

7 Claims, 4 Drawing Sheets

IMAGING SURFACE

LENS, LENS DEVICE, CAMERA MODULE AND ELECTRICAL EQUIPMENT

CROSS-REFERENCE TO RELATED APPLICATIONS

This application is based upon and claims the benefit of priority from the prior Japanese Patent Application No. 11-343204, filed Dec. 2, 1999, the entire contents of which are incorporated herein by reference.

BACKGROUND OF THE INVENTION

The present invention relates to a portable electrical equipment such as a portable telephone or a personal computer, and in particular, to an imaging system mounted in a camera module equipped in such a portable electrical equipment.

In recent years, a camera module for picking up an image has been mounted to a portable information device such as a portable telephone or a notebook type personal computer. Also, a downsizing of the portable information device itself is kept on. According to this trend, requirement for the downsizing of a camera module is raised. Meanwhile, an image sensor using a CCD (Charge Coupled Device), a CMOS or the like achieves a small area of 3.6×2.7 mm (diagonal length: 4.5 mm) in spite of a high quality such as a VGA format (640×480 pixels). In addition, when this image sensor is mounted on a printed circuit board together with a driving circuit and a cover glass, the thickness thereof is about 2.5 mm. When an image sensor having a pixel density of such a VGA format or more, of course, an image pick-up optical system having a high resolution which can exploit the pixel density thereof is required.

Such an optical system comprises a plurality of lenses in a conventional art. For example, when an image sensor with an image size of 3.6×2.7 mm in a VGA format is used, an optical system as shown in FIG. 1 can be obtained. In an imaging system 20 configured by two lenses, the aperture ratio is F/2.8, the focal length is 3.45 mm, an optical system length L from a front surface of a lens to an imaging surface is 5.93 mm. A horizontal total angle of view and a diagonal total angle of view which include a distortion are 56° and 67°, respectively, as a visual field thereof. In a case that this imaging system is used for the camera module, the thickness from a lens-barrel to a backside of the sensor becomes about 8.9 mm (=5.93+2.5+0.5 (corresponding to a projection size of the lens-barrel)).

Now, assuming that the above-mentioned optical system is mounted on, for example, a portable telephone having the thickness of 10.5 mm and configured by a case with the thickness of about 0.9 mm, the thickness of the space surrounded by the case becomes about 8.7 mm. Therefore, a module having the thickness of about 8.9 mm in the optical direction can not be mounted on such a portable telephone. For this reason, a thickness in an axial direction is required to be 8.5 mm or less in a camera module, which is mounted on such a small portable terminal device. Accordingly, the size of the imaging system depends on the structure of a printed circuit board or the like, but the size of the imaging system including the length of the projection portion of the lens-barrel protecting the imaging system must be about 6.0 mm or less.

By shortening a length of an imaging system such as 6.0 mm or less, the diameter of the lens shortens, and it is difficult to form the lens surface with a diameter of 1 cm or less in a highly accurate aspheric shape. Therefore, a lens surface shape with an excellent formability is required in mass production.

BRIEF SUMMARY OF THE INVENTION

An object of the present invention to provide a lens, a camera module, a lens device and an electrical equipment comprising any one of them, which are applicable to the above case.

A lens according to the present invention comprises a lens, which is a single and meniscus lens whose optical surface is aspheric surface, and when a refractive index of the lens is represented by n, a central thickness thereof is represented by t, a radius of curvature of a concave face thereof is represented by r1, the radius of curvature of the convex face thereof is represented by r2, and a focal length thereof is represented by f, the lens satisfies the following equations:

$$-0.2 < \left(\frac{n-1}{r1}\right)/f < 0,$$

$$0.08 < \left(\frac{1-n}{r2}\right)/f < 0.1, \text{ and}$$

$$0.35 < t/f < 0.55.$$

A camera module according to the present invention comprises a lens as mentioned above, and an aperture iris provided on a side of an incident surface of the lens to restrict the amount of an incident light on the lens, a lens-barrel holding a aperture iris and the lens, an image sensor fixed to a hollow portion of the lens-barrel opposed to the lens.

A lens device according to the present invention comprises a lens, and an aperture iris provided on an incident surface side of the lens to restrict an amount of a incident light on the lens, the lens comprises a lens, which is a single and meniscus lens whose optical surface is aspheric surface, and when a refractive index of the lens is represented by n, a central thickness thereof is represented by t, a radius of curvature of a concave face thereof is represented by r1, the radius of curvature of the convex face thereof is represented by r2, and a focal length thereof is represented by f, the lens satisfies the following equations:

$$-0.2 < \left(\frac{n-1}{r1}\right)/f < 0,$$

$$0.08 < \left(\frac{1-n}{r2}\right)/f < 0.1, \text{ and}$$

$$0.35 < t/f < 0.55, \text{ and}$$

when a distance between a concave face of the lens and the aperture iris is d1, the lens device satisfies the following equation:

$$0 < d1/f < 0.1$$

An electrical equipment, which is portable and performs a predetermined operation, comprises a lens device or a camera module as mentioned above mounted on a circuit board provided on the electrical equipment.

In the above-mentioned lens or lens device, a diameter of a concave surface or a convex surface of the lens is equal to or less than 1 cm.

In the above-mentioned camera module, a total length from the aperture iris to the image sensor is equal to or less than 6 mm.

As mentioned above, according to the present invention, an optical system with small size and capable of imaging with high resolution can be provided with one aspheric lens to be able to contribute an improvement in portability of an electrical equipment, which processes image information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of a camera module for a portable terminal device according to the present invention will be explained with reference to the drawings.

Figure 1:
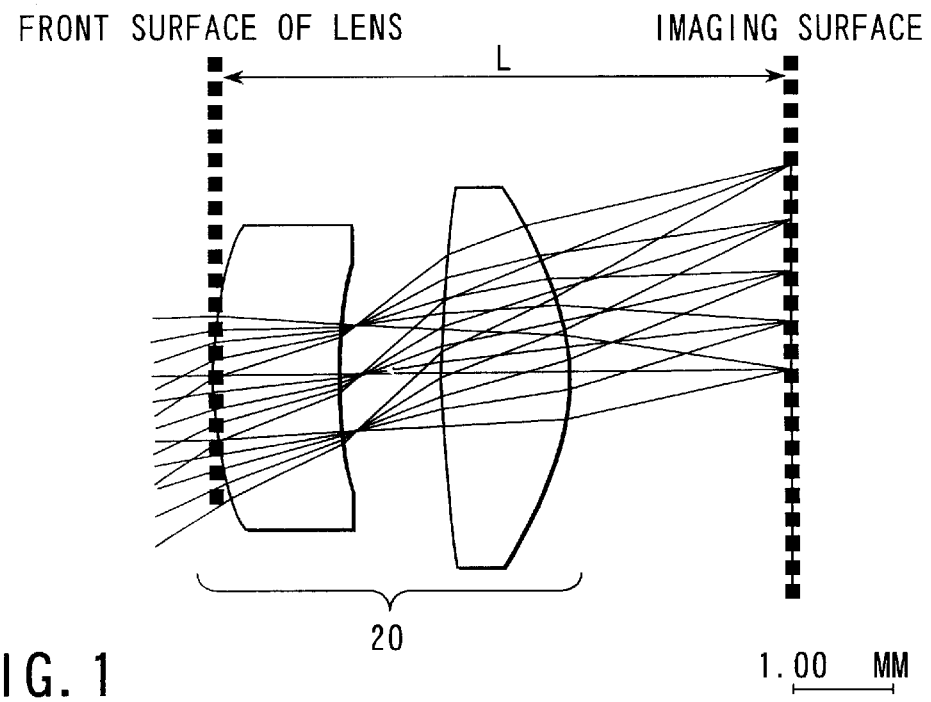
FIG. 1 is an illustrative diagram of an imaging system of a conventional camera module.
Figure 2:
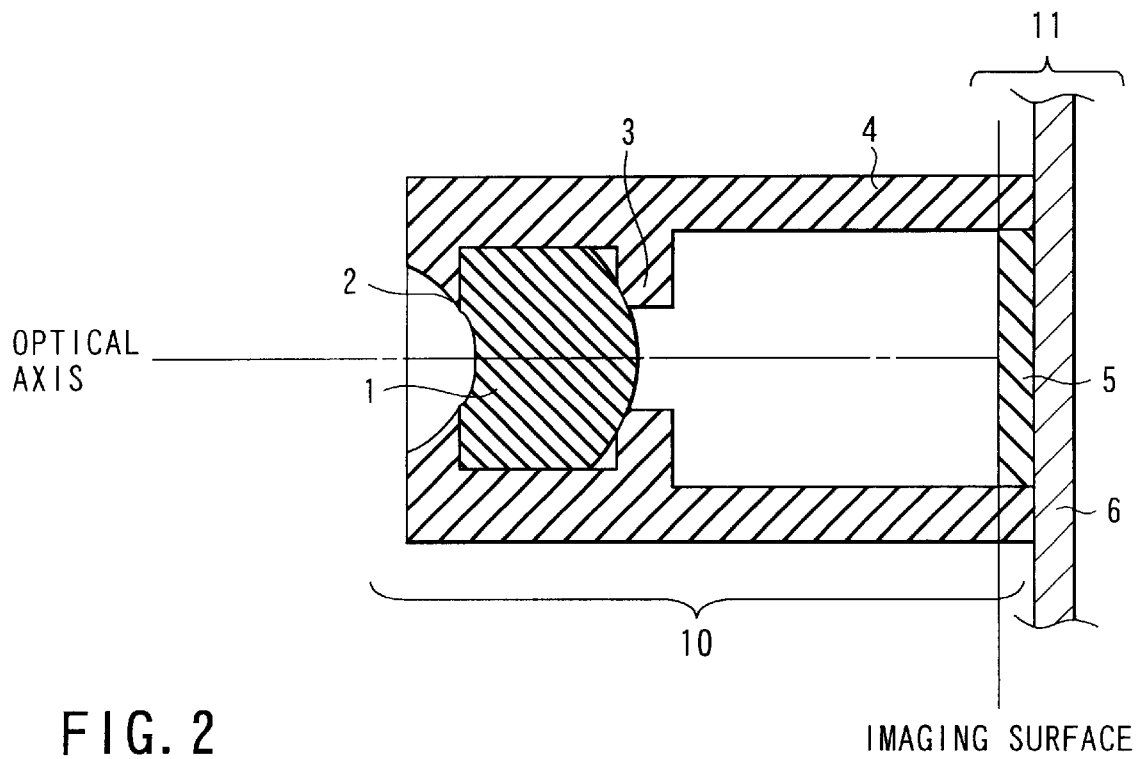
FIG. 2 is a sectional view of a camera module of the present invention.

A camera module shown in a sectional view of FIG. 2 comprises an imaging system 10 and a photo-electric conversion section 11. The imaging system 10 comprises a lens 1 which has a meniscus shape such as a concave face on an object side and a convex face on an photoelectric conversion section side and which is formed of acrylic resin PMMA, an aperture iris 2 which covers a peripheral edge of an optical face on the object side of the lens 1, and a field iris 3 which receives outgoing light from the lens 1 and shields a light of an outgoing light whose angle is more than a predetermined angle of view. The aperture iris 2 and the field iris 3 are respectively provided as portions of a part which is formed integrally with a lens-barrel 4. The lens-barrel 4 is formed by coloring material of epoxy resin or the like to prevent unnecessary light from entering, performing injection molding to form a half part divided along an optical axis direction and then integrating the injection-molded half parts to hold the lens 1 therebetween. Only the light with a predetermined angle of view formed by the field iris 3, which can reach an imaging surface straightly is taken out to focus on the imaging surface which is spaced from the field iris 3 by a predetermined distance. A photoelectric conversion portion 11 is disposed on the imaging surface. An image sensor 5, which can represent gradation or tone, such as a CCD sensor or a CMOS sensor is used as the photoelectric conversion portion. The image sensor 5 is mounted on a printed circuit board 6 on which a circuit to process signals output from the image sensor 5 is formed. The imaging system 10 may be configured such that the field iris and the lens-barrel are provided to preformed lens device obtained by integrating the lens 1 and the aperture iris 2 in advance.

Figure 3:
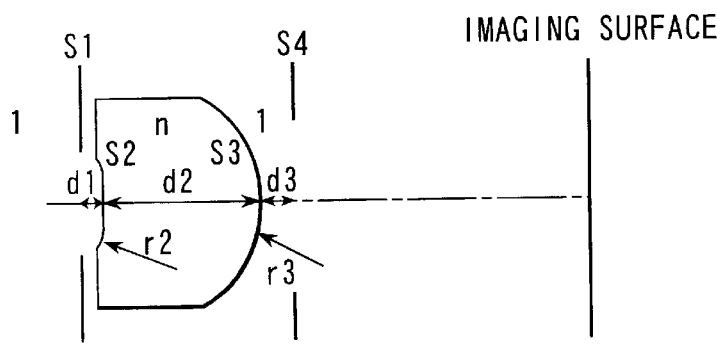
FIG. 3 is an illustrative diagram of an imaging system of the camera module of the present invention.

Table 1 shows a radius of curvature, a distance from the next surface, a refractive index, an Abbe number, an effective diameter in each aspect, and FIG. 3 shows each surfaces of an illustrative diagram according to definition of each parameter.

TABLE 1

| Surface number S(i) | RADIUS OF CURVATURE (ri) | DISTANCE (di) | REFRACTIVE INDEX (ni) | ABBE NUMBER (vi) | EFFECTIVE DIAMETER ($\phi$i) |
|---|---|---|---|---|---|
| 1 (APERTURE IRIS) | ∞ | 0.1 | (AIR) | (AIR) | 1.25 |
| 2 (CONCAVE FACE) | −62.898 | 1.8 | 1.49115 | 57.5 | 1.27 |
| 3 (CONVEX FACE) | −1.719 | 0.5 | (AIR) | (AIR) | 2.47 |
| 4 (FIELD IRIS) | ∞ | 3.126 | (AIR) | (AIR) | 2.87 |
| IMAGING SURFACE | — | — | — | — |

When the radius of curvature is represented by R, undulation Z at a diameter h of the aspheric surface is generally expressed by the following equation (1). Table 2 shows K, A, B, and C corresponding to aspheric surfaces of the lens 1 at this time.

TABLE 2

| SURFACE NUMBER S(i) | K(i) | A(i) | B(i) | C(i) |
|---|---|---|---|---|
| 2 | −99.0 | −5.045 × 10$^{-2}$ | 1.65 × 10$^{-2}$ | 2.65 × 10$^{-2}$ |
| 3 | 0.257 | 4.314 × 10$^{-2}$ | −2.78 × 10$^{-2}$ | 1.25 × 10$^{-2}$ |

$$Z(h) = \frac{h^2}{R \cdot \left(1 + \sqrt{1 - (1+K)h^2/R^2}\right)} + Ah^4 + Bh^6 + Ch^8 \quad (1)$$

According to the above structure, the imaging system 10 of the present invention achieves a system which is relatively bright and has a focusing characteristic of a high resolution, which can correspond to VGA, and a system in which the aperture ratio is F/2.8, the focal distance is 3.55 mm, and the optical system length from the aperture iris to the imaging surface is 5.526 mm. The imaging system 10 is a system for image size of 3.6×2.7 mm (diagonal length: 4.5 mm) and can pick up or photograph an image having a horizontal angle of view of 56° and a diagonal angle of view of 70°. The values of these angles of view are set in view of a distortion. Since the light beam exceeds the angle of view may be disturbance, it is preferable to restrict the light beam by the field iris 3.

Figure 4:
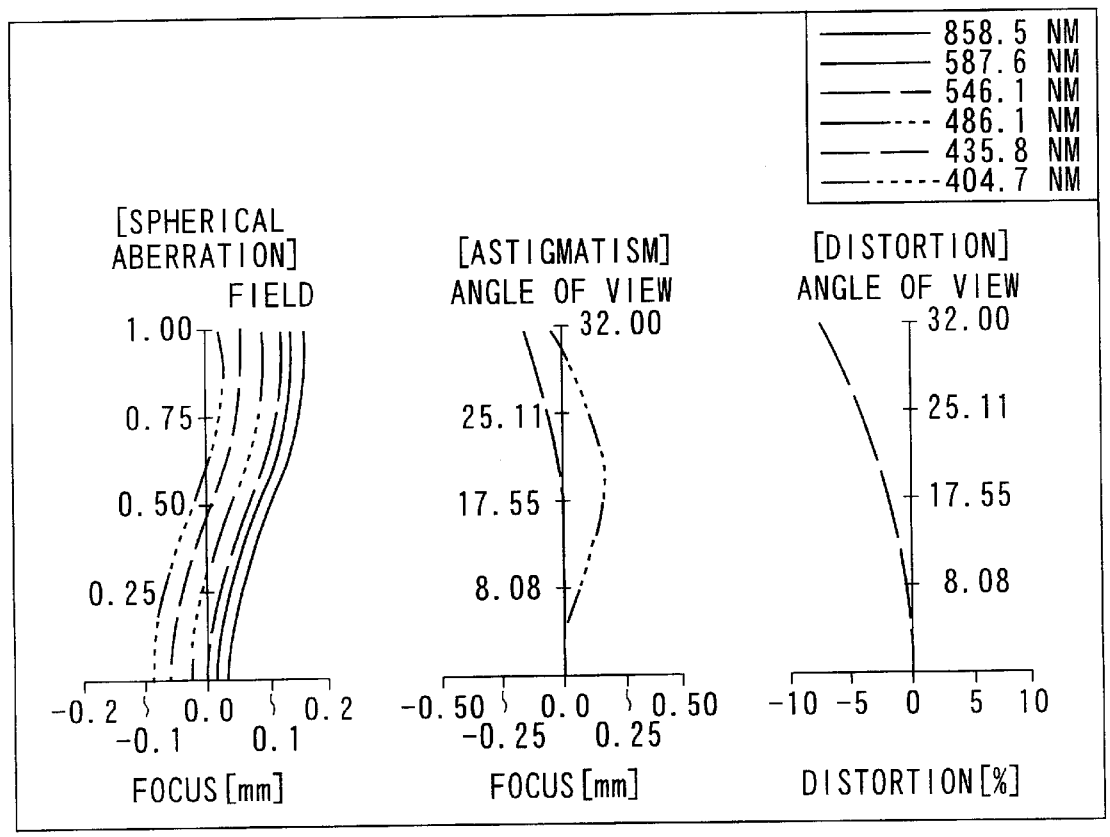
FIG. 4 is a graph showing characteristics of the camera module of the present invention.
Figure 5:
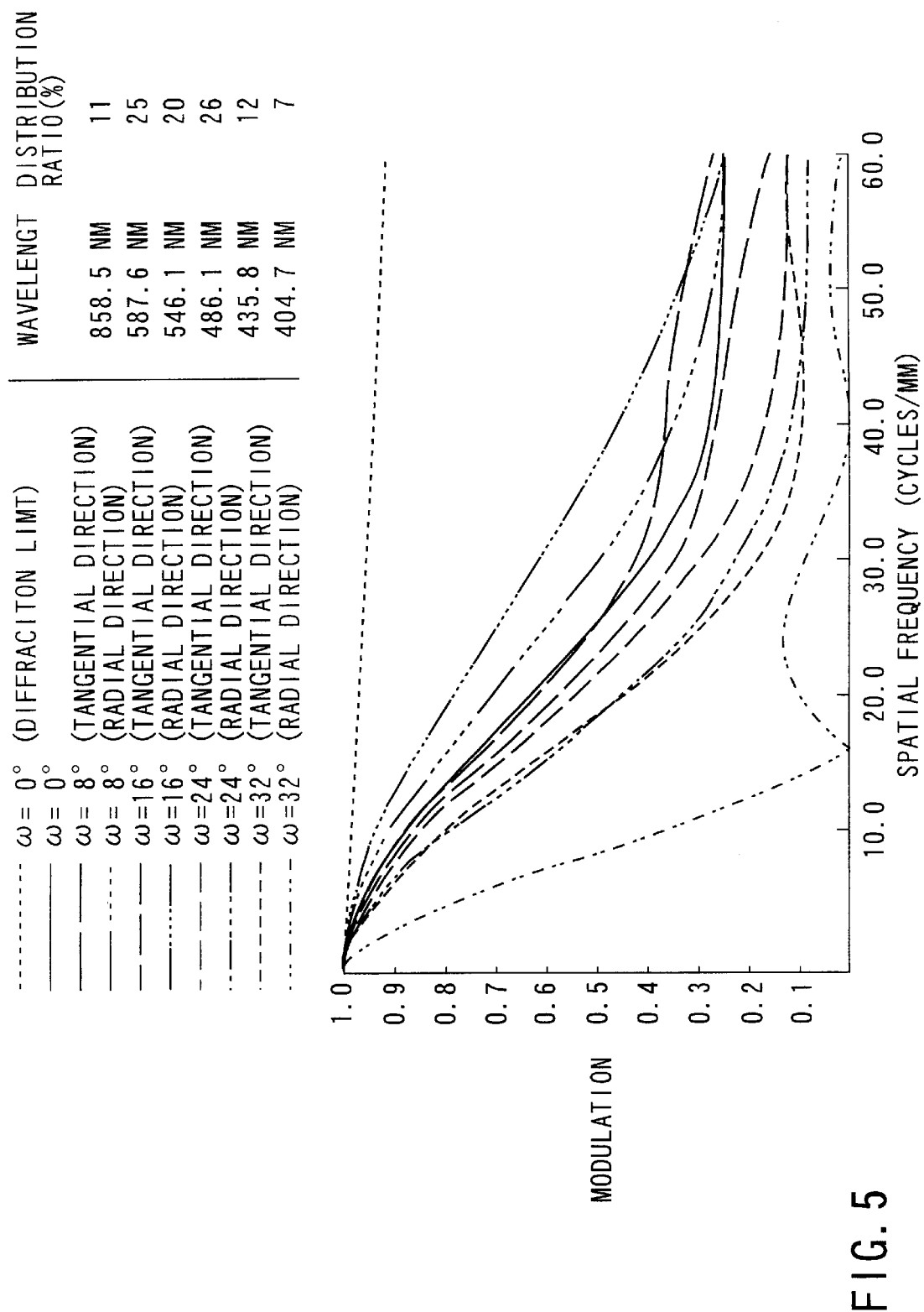
FIG. 5 is a graph showing characteristics of the camera module of the present invention.

FIG. 4 is graphs showing characteristics of angle of view of spherical aberration, astigmatism and distortion, and FIG. 5 is a graph showing a characteristic regarding spatial frequency of MTF at each angle of view. These figures show that the optical system of the embodiment has an effective characteristic to a sensor with a VGA format.

In this manner, to obtain effective characteristics to the sensor with a VGA format, it has been confirmed that it is preferable the lens has a structure satisfying at least the following equations (2) to (4).

$$-0.2 < \left(\frac{n-1}{r2}\right)/f < 0 \quad (2)$$

$$0.08 < \left(\frac{1-n}{r3}\right)/f < 0.1 \quad (3)$$

$$0.35 < d2/f < 0.55 \quad (4)$$

In the lens of the present embodiment, it has been confirmed that the values based upon the equations (2) to (4) are −0.0220, 0.0805, and 0.507, respectively, which satisfy the equations (2) to (4), and which are suitable for an image sensor with an image size of 3.6×2.7 mm. By using such a lens to perform an image pick-up, since an image and a small spherical aberration can be obtained with a single lens having a short focal length, so that a camera module can be mounted to an electrical equipment without reducing a portability of the equipment.

By designing the lens surface whose shape satisfies equations (2) to (4), a ridge line in an arbitrary section of the lens can be configured by a monotonous shape without having an inflection point.

Furthermore, it has been confirmed that, when a camera module is assembled by incorporating this lens to the imaging system, it is difficult to attain such characteristics by using a lens having both convex faces but it is preferable to use a meniscus lens to dispose a convex shape on the side of the imaging surface of the lens.

Also, it has been confirmed that, when the relationship between a lens and an aperture iris satisfies the following Equation (5), the equation for aspheric surface of a lens is simplified so that formation of the lens is easily formed.

$$0 < d1/f < 0.1 \quad (5)$$

The value in the camera module of the above embodiment becomes 0.028 which satisfies the Equation (5).

As mentioned above, for downsizing a camera module for a portable information device, a single aspheric surface lens is used, the aperture iris, the lens and the field iris are arranged from an object side towards the imaging surface, and the lens is formed in the convex surface on the imaging surface side. Thus, in the imaging system in which the distance from the aperture iris to the imaging surface is short, it is desirable to provide the field iris in order to prevent the incident light exceeding necessary angle of view from being incident on the imaging surface regardless of a focusing action.

According to the present invention, the spherical aberration and the astigmatism can be made relatively small, and the image pick-up with a high resolution becomes possible by a single lens. Therefore, the lens surface, in which a length of an imaging system is 6.0 mm or less, in addition, a diameter thereof is 1 cm or less, can be easily formed.

Figure 6:
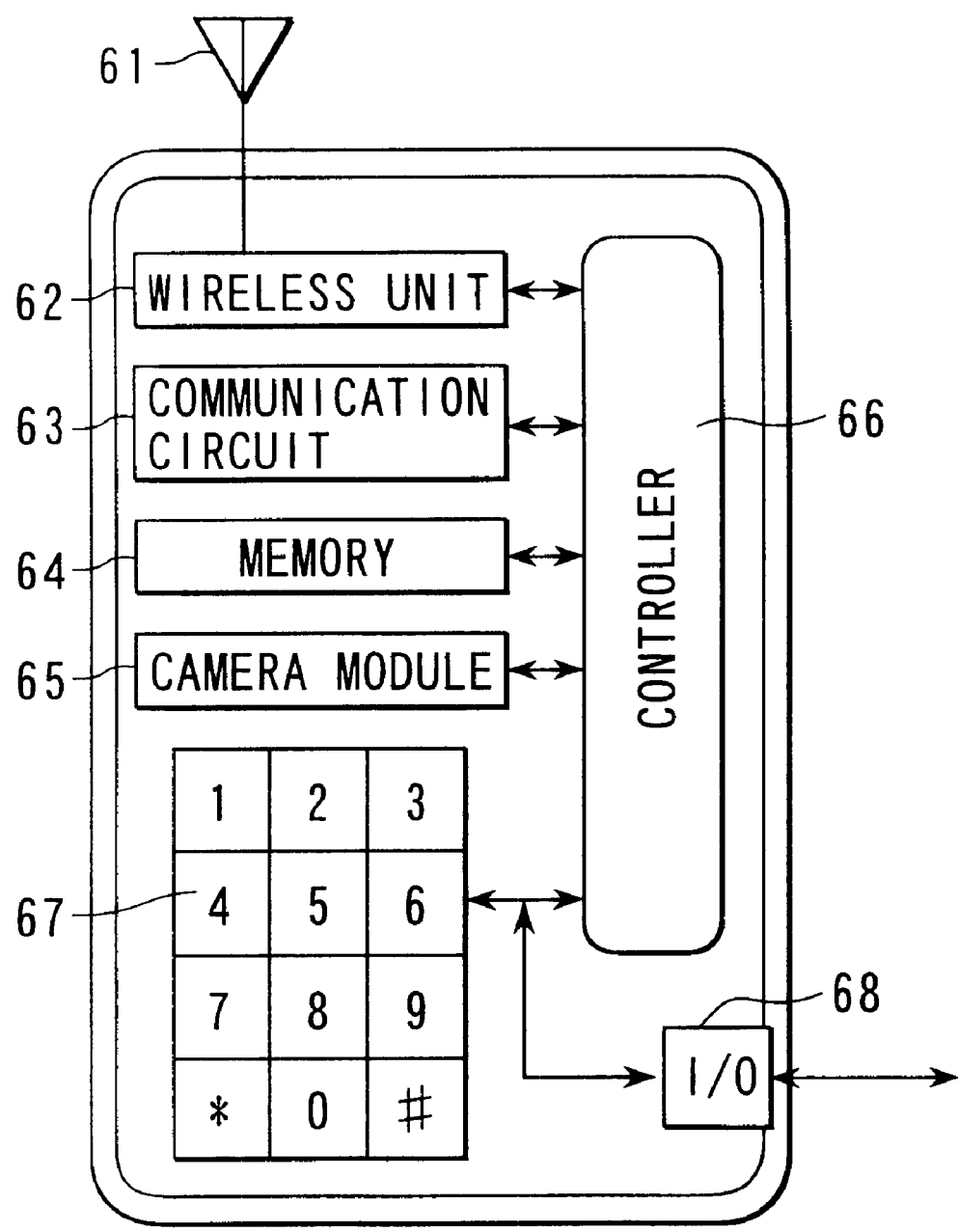
FIG. 6 is an illustrative diagram of a portable telephone mounted with the camera module.

When the camera module is built in not only a telephone but also an electrical equipment where a portability is important and which performs a predetermined operation, such as a personal computer having a portability, it becomes possible to provide an image pick-up with an excellent image quality without reducing a portability. An illustrative diagram of a telephone mounted with this camera module is shown in FIG. 6 as one aspect of such an electrical equipment having a portability.

In this telephone, an antenna 61 which receives/transmits radio wave, a wireless unit 62 which is connected to the antenna 61 and performs a mutual conversion between a radio signal and an electric signal, a communication circuit 63 which is connected to a speaker and/or a microphone and performs the mutual conversion between an audio signal and an electric signal, a memory 64 which performs a temporary storage which is necessary when processing electric signals within the telephone and stores desired telephone numbers and the like, a camera module 65 as mentioned-above, a controller 66 which controls systematically these members and allows communication, and a key input section 67 which can arbitrarily control the controller 66 are mounted on a printed circuit board to configure a circuit apparatus, and they are accommodated in a case. According to such a configuration, it becomes possible to perform not only a communication of a usual audio information realized by a telephone but also a transmission of an image information.

In addition, a display unit for displaying the received image or video signals is connected to the controller 66 so that communication of image information becomes possible. Also, it becomes possible to output the image information to a personal computer or the like via a connector 68 provided to be connectable to an external equipment. It is considered that the external device is an equipment in which a portability is not required. In such a case, image information output from the equipment may be shown by a display apparatus of the equipment, for example, a large screen of a diagonal line of 30 cm or more. Even in such a case, since the spherical aberration of an image taken in by the camera module 65 using the lens of the present invention is suppressed to a low level, it becomes possible to provide an image whose blur is reduced and in which an object to be displayed can be easily identified.

The above-mentioned camera module is built in an electric still camera, a portable telephone or a computer, so that it becomes possible to provide a thinner product and a portability can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera module comprising:

a lens comprising a lens, which is a single and meniscus lens whose optical surface is an aspheric surface, wherein when a refractive index of said lens is represented by n, a central thickness thereof is represented by t, a radius of curvature of a concave face thereof is represented by r1, a radius of curvature of a convex face thereof is represented by r2, and a focal length thereof is represented by f, said lens satisfies the following equations:

$$-0.2 < \left(\frac{n-1}{r1}\right)/f < 0,$$

$$0.08 < \left(\frac{1-n}{r2}\right)/f < 0.1, \text{ and}$$

$$0.35 < t/f < 0.55;$$

an aperture iris provided on a side of an incident surface of said lens to restrict an amount of an incident light on the lens;

a lens-barrel holding the aperture iris and said lens; and an image sensor fixed to a hollow portion of said lens-barrel opposed to said lens.

2. An electrical equipment, which has a portability and performs a predetermined operation, comprising a camera module according to claim 1 mounted on a circuit board provided on the electrical equipment.

3. A lens device comprising a lens, and an aperture iris provided on an incident surface side of said lens to restrict an amount of a incident light on said lens, wherein said lens comprises a lens, which is a single and meniscus lens whose optical surface is aspheric surface, and when a refractive index of said lens is represented by n, a central thickness thereof is represented by t, a radius of curvature of a concave face thereof is represented by r1, the radius of curvature of the convex face thereof is represented by r2, and a focal length thereof is represented by f, said lens satisfies the following equations:

$$-0.2 < \left(\frac{n-1}{r1}\right)/f < 0,$$

$$0.08 < \left(\frac{1-n}{r2}\right)/f < 0.1, \text{ and}$$

$$0.35 < t/f < 0.55, \text{ and}$$

when a distance between a concave face of said lens and said aperture iris is d1, said lens device satisfies the following equation:

$$0 < d1/f < 0.1$$

4. An electrical equipment, which is portable and performs a predetermined operation, comprising a lens device according to claim 3 mounted on a circuit board provided on the electrical equipment.

5. A lens comprising a lens, which is a single and meniscus lens whose optical surface is an aspheric surface, wherein when a refractive index of said lens is represented by n, a central thickness thereof is represented by t, a radius of curvature of a concave face thereof is represented by r1, a radius of curvature of a convex face thereof is represented by r2, and a focal length thereof is represented by f, said lens satisfies the following equations:

$$-0.2 < \left(\frac{n-1}{r1}\right)/f < 0,$$

$$0.08 < \left(\frac{1-n}{r2}\right)/f < 0.1, \text{ and}$$

$$0.35 < t/f < 0.55, \text{ and}$$

a diameter of the concave surface or the convex surface of said lens is equal to or less than 1 cm.

6. The lens device according to claim 3, wherein a diameter of a concave surface or a convex surface of said lens is equal to or less than 1 cm.

7. The camera module according to claim 1, wherein a total length from said aperture iris to said image sensor is equal to or less than 6 mm.

* * * * *